United States Patent [19]

Sugihara et al.

[11] Patent Number: 4,999,179

[45] Date of Patent: Mar. 12, 1991

[54] METHOD FOR PURIFYING IMPURE AQUEOUS HYDROGEN PEROXIDE SOLUTION

[75] Inventors: Yasuo Sugihara, Kashiwa; Shigeki Shimokawa, Yokkaichi, both of Japan

[73] Assignee: Mitsubishi Gas Chemical Company, Inc., Tokyo, Japan

[21] Appl. No.: 447,521

[22] Filed: Dec. 7, 1989

[30] Foreign Application Priority Data

Dec. 26, 1988 [JP] Japan .................................. 63-326190

[51] Int. Cl.$^5$ ............................................. C01B 15/01
[52] U.S. Cl. ..................................................... 423/584
[58] Field of Search ......................................... 423/584

[56] References Cited

U.S. PATENT DOCUMENTS

| 2,676,923 | 4/1954 | Young ................................. 423/588 |
| 3,012,860 | 12/1961 | Meeker et al. ...................... 423/584 |
| 3,156,531 | 11/1964 | Luten et al. ........................ 423/584 |
| 3,294,488 | 12/1966 | Dunlop et al. ...................... 423/584 |
| 3,297,404 | 1/1967 | Elliott et al. ....................... 423/584 |
| 3,305,314 | 2/1967 | Freeland et al. .................... 423/584 |
| 3,387,938 | 6/1968 | Leaver et al. ....................... 423/584 |
| 4,792,403 | 12/1988 | Togo et al. ......................... 423/584 |

FOREIGN PATENT DOCUMENTS

| 659770 | 3/1963 | Canada ............................... 423/584 |
| 50982 | 4/1966 | Poland ............................... 423/584 |
| 55378 | 4/1968 | Poland ............................... 423/584 |
| 819434 | 9/1959 | United Kingdom ................ 423/584 |
| 826015 | 12/1959 | United Kingdom ................ 423/584 |
| 844029 | 8/1960 | United Kingdom ................ 423/584 |

Primary Examiner—Wayne A. Langel
Attorney, Agent, or Firm—Wenderoth, Lind & Ponack

[57] ABSTRACT

A method for purifying an impure aqueous hydrogen peroxide solution, which comprises passing an impure aqueous hydrogen peroxide solution through (a) a cation exchange resin layer, a halogen-containing porous resin layer and an anion exchange resin layer in this order, or
(b) a halogen-containing porous resin layer, a cation exchange resin layer and an anion exchange resin layer in this order, or
(c) a halogen-containing porous resin layer and a cation/anion mixed-bed resin layer in this order to contact said solution with each resin.

10 Claims, No Drawings

METHOD FOR PURIFYING IMPURE AQUEOUS HYDROGEN PEROXIDE SOLUTION

BACKGROUND OF THE INVENTION (1) Field of the Invention

The present invention relates to a method for purifying an impure aqueous hydrogen peroxide solution to obtain a highly purified aqueous hydrogen peroxide solution which contains each metal cation, each anion and organic impurities in a very small amount, respectively.

(2) Description of Related Art

Aqueous hydrogen peroxide solutions are in wide use not only as a reagent but also in many fields such as bleaching, chemical polishing and the like. In recent years, the utilization of an aqueous hydrogen peroxide solution has spread to the field of semiconductor production where said solution is used for the cleaning, etching, etc. of water; in this connection, an aqueous hydrogen peroxide solution of high purity has become necessary.

That is, in the production of a semiconductor, particularly VLSI, its memory capacity and number of elements have increased and, in parallel therewith, its dimension of minimum pattern has become very fine. When the aqueous hydrogen peroxide solution which is used for the cleaning of VLSI contains impurities and fine particles, the particles adhere onto the surface film of the VLSI, causing a thinning of the oxide film or a deterioration of the voltage resistance of the $SiO_2$ film. Further when impurities diffuse onto the Si substrate, there occurs an increase in leakage current and a shortening of carrier life, causing a decrease in yield of product LSI and a deterioration of properties of said LSI.

Thus, in the production of a semiconductor, it is required to develop an aqueous hydrogen peroxide solution of high purity which contains fine particles and impurities in a very small amount.

As mentioned above, in the field of semiconductor production, the chemical agents used therefor are desired to contain impurities in as small an amount as possible because the impurities contained in said agents greatly affect the quality of the product obtained. In particular, the aqueous hydrogen peroxide solution used for cleaning a semiconductor is required to have a very high purity and to contain each metal cation in an amount of not more than 5 ppb ($\mu$g/kg), each anion in an amount of not more than 10 ppb and organic impurities in an amount of not more than 5 ppm (mg/kg) in terms of total organic carbon amount.

Meanwhile, hydrogen peroxide is currently produced in industry mainly by the autoxidation of anthrahydroquinone (this process is hereinafter referred to as the anthraquinone process). The aqueous hydrogen peroxide solution produced by the anthraquinone process contains a very small amount of impurities, and the amount is ordinarily about 10–500 mg/l in terms of total organic carbon amount.

Said aqueous hydrogen peroxide solution further contains, as impurities, ordinarily about 5 ppb to about 10 ppm of each of various metal cations and about 10 ppb to about 10 ppm of each of various anions as a result of dissolution of construction materials of production and storage facilities, addition of additives, etc.

In order to remove these impurites to obtain a purified aqueous hydrogen peroxide solution, there have conventionally been known several methods as shown below, and some of them are employed in actual use.

(a) Japanese Patent Publication No. 3816/1953

This patent document discloses a method comprising contacting an aqueous hydrogen peroxide solution with a sulfonated aromatic hydrocarbon type cation exchange resin to remove mainly the metal cations contained in said aqueous hydrogen peroxide solution.

This patent document discloses a method for removing the anion impurities contained in an aqueous hydrogen peroxide solution by using an anion exchange resin having a quaternary ammonium group of carbonate and/or bicarbonate form.

(c) Japanese Patent Publication No. 26095/1971

This patent document discloses a method for removing by adsorption the organic impurities contained in an aqueous hydrogen peroxide solution by using a resin having a reticulate molecular structure obtained by crosslinking with divinylbenzene but having no ion exchange group.

(d) Japanese Laid-Open Patent Publication No. 156004/1988

This patent document discloses a method for removing by adsorption the organic impurities contained in an aqueous hydrogen peroxide solution by using a halogen-containing porous resin having a true specific gravity of 1.1-1.3.

Any of the above known methods for purification of an aqueous hydrogen peroxide solution, however, is unable to provide an aqueous hydrogen peroxide solution of such high quality as to allow its use in the production of a semiconductor, particularly LSI. That is, any of the above known methods cannot provide a high purity aqueous hydrogen peroxide solution containing each metal cation in an amount of no t more than 5 ppb, each anion in an amount of not more than 10 ppb and organic impurities in an amount of not more than 5 ppm.

For example, in the method using a cation exchange resin, metal cation impurities can be removed but anion impurities increase because a part of the $SO_3H$ group which is the ion exchange group of said resin is deteriorated by the action of hydrogen peroxide and dissolves in the form of $SO_4^{2-}$.

Also, in the method using a halogen-containing porous resin, organic impurities can be advantageously removed but anion impurities increase because a part of the halogen in said resin dissolves.

There have also been proposed methods for purifying an aqueous hydrogen peroxide solution, which use a plurality of ion exchange resins in combination. For example, Poland Patent No. 55,378 discloses a method comprising passing an aqueous hydrogen peroxide solution through a cation exchange resin, an anion exchange resin and a cation/anion mixed-bed resin in this order to contact the solution with each resin. This method, however, is unable to remove organic impurities.

Thus, in any of the conventionally known methods, it has been impossible to obtain a high quality aqueous hydrogen peroxide solution containing each metal cation, each anion and organic impurities in respective amounts of not more than the above mentioned levels.

SUMMARY OF THE INVENTION

The first object of the present invention is to provide an aqueous hydrogen peroxide solution of very high quality by purifying an impure aqueous hydrogen peroxide solution.

The second object of the present invention is to provide a purification method for obtaining an aqueous hydrogen peroxide solution of high quality which can be used for the production of a semiconductor, particularly LSI.

Another object of the present invention is to provide a method for purifying an impure aqueous hydrogen peroxide solution to obtain a high purity aqueous hydrogen peroxide solution containing each metal cation in an amount of not more than 5 ppb, each anion in an amount of not more than 10 ppb and organic impurities in an amount of not more than 5 ppm in terms of total organic carbon amount.

Still another object of the present invention is to provide a method for obtaining the above mentioned aqueous hydrogen peroxide solution of high quality by an industrially advantageous means.

Other objects of the present invention will become apparent from the following description.

DESCRIPTION OF THE PREFERRED EMBODIMENTS

The research conducted by the present inventors has revealed that the above objects and advantages of the present invention can be achieved by a method for purifying an impure aqueous hydrogen peroxide solution, which comprises passing an impure aqueous hydrogen peroxide solution through (a) a cation exchange resin layer, a halogen-containing porous resin layer and an anion exchange resin layer in this order, or (b) a halogen-containing porous resin layer, a cation exchange resin layer and an anion exchange resin layer in this order, or (c) a halogen-containing porous resin layer and a cation/anion mixed-bed resin layer in this order to contact said solution with each resin.

The impure aqueous hydrogen peroxide solution to be treated by the purification method of the present invention can be any impure aqueous hydrogen peroxide solution produced by any process. Ordinarily, there is preferably used an impure aqueous hydrogen peroxide solution produced by the anthraquinone process. In the anthraquinone process, generally a 2-alkylanthraquinone is hydrogenated in the presence of a hydrogenation catalyst in a water-insoluble solvent to convert to a corresponding anthrahydroquinone, the catalyst is removed by filtration, the anthrahydroquinone is oxidized by air or oxygen to regenerate the original anthraquinone and simultaneously obtain hydrogen peroxide, and the reaction mixture is extracted with water to obtain a crude aqueous hydrogen peroxide solution.

The thus produced crude aqueous hydrogen peroxide solution is purified and concentrated by vacuum vaporization and rectification to obtain an aqueous hydrogen peroxide solution containing generally about 10 to about 70% by weight, particularly about 20 to about 60% by weight of hydrogen peroxide.

The thus obtained aqueous hydrogen peroxide solution is fairly purified but contains organic impurities generated in the production steps as well as various cations and anions resulting from the use of a stabilizer and the dissolution of materials of reactors, pipes and storage tanks; therefore, said hydrogen peroxide solution per se cannot be used for cleaning in the production of a semiconductor.

Thus, industrially produced aqueous hydrogen peroxide solutions contain not only organic impurities but also metal cations (e.g. Al, Na, K, Cu, Fe, Cr) and anions (e.g. $Cl^-$, $Br^-$, $PO_4^{3-}$, $SO_4^{2-}$). These metal cations and anions are typical examples, and other cations and anions are contained although in smaller amounts. According to the present invention, all cations and anions can be removed to respective target levels or below.

According to the present invention, an impure aqueous hydrogen peroxide solution to be purified is passed through resin layers in the following order (a), (b) or (c) to contact with each resin in each resin layer, whereby a high quality aqueous hydrogen peroxide solution can be obtained. ( (a) Cation exchange resin layer→halogen-containing porous resin layer→anion exchange resin layer;

(b) Halogen-containing porous resin layer→cation exchange resin layer→anion exchange resin layer;

(c) Halogen-containing porous resin layer→cation-/anion mixed-bed resin layer.

The purification method of the present invention is characterized in that an impure aqueous hydrogen peroxide solution to be purified is contacted with all of a cation resin, an anion resin and a halogen-containing porous resin in a given order. The resin with which the impure aqueous hydrogen peroxide solution is contacted lastly is an anion exchange resin or a cation/anion mixed-bed resin.

In the purification method of the present invention, an impure aqueous hydrogen peroxide solution is passed through resin layers in the order (a), (b) or (c). Accordingly, the objects of the present invention can be achieved as long as the order (a), (b) or (c) for passing the hydrogen peroxide solution through the resin layers is obeyed. It is also possible, prior to the treatment according to the order (a), (b) or (c), to employ another purification method or install an additional ion exchange resin layer. For example, contact with a cation exchange resin can be effected prior to the contact with the resins according to the order (a), (b) or (c).

In the purification method of the present invention, when the impure aqueous hydrogen peroxide solution to be treated contains organic impurities in a large amount, the order (b) is preferred in order to avoid contamination of the cation exchange resin by the organic impurities; when said hydrogen peroxide solution contains each of metal cation impurites and anion impurities in a low concentration of not more than 100 ppb, the order (c) is preferred because it uses a smaller number of columns and the purified solution contains a smaller amount of impurities.

Next, there are described in detail the resin constituting each resin layer as well as the conditions of contact of resin and aqueous hydrogen peroxide solution in each resin layer.

Cation exchange resin layer

As the resin constituting this resin layer, there is used a cation exchange resin having a $SO_3H$ group as an ion exchange group. This cation exchange resin is generally obtained by sulfonating a styrene-divinylbenzene crosslinked copolymer with sulfuric acid. The cation exchange resin is preferably a resin having a strongly acidic group and a high crosslink density. As such a resin, there can be mentioned, for example, Amberl ®200C, 200CT and 252 and DIAION ®PK series (e.g. PK 224, PK 228). These resins are put on the market generally in the form of Na ion and, in using a resin layer formed therewith, are converted to a H ion form by passing through the resin layer an aqueous solution of a strong acid such as sulfuric acid, hydrochloric acid or the like. The conversion to a H ion form is effected by passing an aqueous solution of sulfuric acid or hydrochloric acid through the resin layer and then passing pure water to thoroughly wash the resin layer with the water. The resins put on the market in a H ion form, such as Amberlite ®200CH and the like can be used as they are.

The temperature at which an impure aqueous hydrogen peroxide soluton (hereinafter abbreviated simply to "aqueous solution" in some cases) is passed through the cation exchange resin layer is suitably about 30° C. or below, preferably −10° C. to 20° C. When the temperature is higher than 30° C., the amount of the ion exchange group (SO$_3$H) dissolving in the aqueous solution increases, which is undesirable. The space velocity at which the aqueous solution is passed through the resin layer is suitably about 1 to about 500 l/hr, preferably about 20 to about 300 l/hr when expressed by the following formula.

Space velocity (l/hr)=[Flow volume per hour of aqueous solution (m$^3$/hr)]/[resin volume (m$^3$)]

In the cation exchange resin layer, the volume of the aqueous solution to be passed therethrough and contacted therewith, relative to the resin volume varies depending upon the concentration of the metal cations in the aqueous solution but desirably is generally about 200 to 50,000 times, preferably about 500 to 20,000 times.

The linear velocity at which the aqueous solution is passed through the cation exchange resin layer is suitably about 1 to about 100 m/hr when expressed by the following formula.

Linear velocity (m/hr) = [Flow volume per hour of aqueous solution (m$^3$/hr)]/[cross-sectional area of resin layer (m$^2$)]

Anion exchange resin layer

The resin constituting this resin layer can be a strongly basic resin having a quaternary ammonium group, a weakly basic resin having a tertiary ammonium group, or a vinylpyridine type resin. The resin is preferably a stronqly basic resin having a quaternary ammonium group, particularly preferably a resin having a quaternary ammonium group of carbonate or bicarbonate form.

The anion exchange resin can be obtained generally by chloromethylating a styrene-divinylbenzene crosslinked copolymer and then aminating the resulting compound. When the amination is effected with trimethylamine, in particular, there can be obtained a strongly basic resin having a quaternary ammonium group. As mentioned above, the anion exchange resin is preferably a resin of high basicity and high crosslink density. As such an anion exchange resin, there can be mentioned, for example, Amberlite ®IRA series (e.g. IRA-900, IRA-904) and DIAION ®PA series (e.g. PA316, PA318). These resins are put on the market generally in a Cl ion form and, in using the resin layer formed therewith, are converted to a carbonate or bicarbonate ion form by passing through the resin layer an aqueous solution of a carbonate or bicarbonate. The conversion to a carbonate or bicarbonate ion form is effected by passing through the resin layer an aqueous solution of sodium carbonate or sodium bicarbonate and then passing pure water to thoroughly wash the resin layer with the water.

The temperature at which the impure aqueous hydrogen peroxide solution is passed through the anion exchange resin layer is suitably about 10° C. or below, preferably −10° C. to 5° C. When the temperature is higher than 10° C., hydrogen peroxide decomposes easily, bubbles accumulate in the resin layer, and as a result, the purification degree for the aqueous solution is reduced. The space velocity at which the aqueous solution is passed through the anion exchange resin layer is suitably about 10 to about 500 l/hr, preferably about 20 to about 300 l/hr. The volume of the aqueous solution to be passed through and contacted with the anion exchange resin layer, relative to the resin volume in the resin layer varies depending upon, for example, the anion concentration in the aqueous solution but is desirable to be generally about 200 to about 50,000 times, preferably about 500 to about 20,000 times.

The linear velocity at which the aqueous solution is passed through the anion exchange resin layer is suitably about 4 to about 100 m/hr.

Cation/anion mixed-bed resin layer

This resin layer is a mixed resin layer consisting of a cation exchange resin and an anion exchange resin and is formed by uniformly mixing the above-mentioned cation exchange resin and the above-mentioned anion exchange resin at a weight ratio of about 1:3 to about 3:1, preferably about 1:2 to about 2:1.

The temperature at which the impure aqueous hydrogen peroxide solution is passed through the mixed resin layer is suitably about 10° C. or below, preferably −10° C. to 5° C. When the temperature is higher than 10° C., hydrogen peroxide decomposes easily, bubbles accumulate in the resin layer, and as a result, the purification degree for the aqueous solution is reduced. The space velocity at which the aqueous solution is passed through the mixed resin layer is suitably about 5 to about 300 l/hr, preferably about 10 to about 200 l/hr. The linear velocity of the aqueous solution is suitably about 4 to about 100 m/hr. The volume of the aqueous solution relative to the mieed resin volume in the resin layer varies depending upon the types and concentrations of the ions contained in the aqueous solution but suitably is generally about 100 to about 30,000 times, preferably about 200 to about 10,000 times.

Halogen-containing porous resin layer

As preferable examples of the halogen-containing porous resin constituting the halogen-containing porous resin layer, there can be mentioned (1) a halogenation product of a crosslinked polymer of an aromatic monovinyl compound monomer and an aromatic polyvinyl compound monomer, (2) a crosslinked polymer of a halogenated aromatic monovinyl compound monomer and an aromatic polyvinyl compound monomer, and (3) a cross-linked polymer of a halogenated aromatic monovinl compound monomer, an aromatic monovinyl compound monomer and an aromatic polyvinyl compound monomer.

Specific examples of each of the above monomers are described. The aromatic monovinyl compound x:onomer includes, for example, styrene and vinyltoluene. The aromatic polyvinyl compound monomer includes, for example, divinylbenzene and trivinylbenzene The halogenated aromatic monovinyl compound monomer includes, for example, monochlorostyrene and monobromostyrene.

As the halogenation product of a crosslinked polymer of an aromatic monovinyl compound monomer and an aromatic polyvinyl compound monomer, there are preferably mentioned, for example, chlorination or bromination products of a styrene-divinylbenzene copolymer, a styrene-trivinylbenzene copolymer and a vinyltoluene-divinylbenzene copolymer. The chlorination or bromination for obtaining these products can be effected by contacting said copolymer with molecular chlorine or molecular bromine in the presence of a catalyst such as ferric chloride, boron fluoride or the like. Of the above products, a halogenation product of a styrene-divinylbenzene copolymer is most suitable for use in the present invention.

The thus obtained halogen-containing porous resin suitably contains a halogen in an amount of about 10 to about 40% by weight, preferably about 25 to about 40% by weight based on the weight of the dried resin. The porous resin has pores continuous to each other directly or indirectly, and the porosity, when expressed as specific surface area, advantageously is about 200 to about 600 $m^2$ per g of dried resin preferably about 400 to about 600 $m^2$ per g of dried resin. The specific surface area was measured by the BHT method ($N_2$). The porous resin advantageously has continuous pores in a volume of about 0.3 to about 1 ml per g of dried resin. This pore volume was measured by the mercury penetration method.

The porous resin desirably is in the form of particles having an average particle diameter of about 0.1 to about 0.5 mm. The average particle diameter refers to such a mesh of a sieve that about 10% by weight of the porous resin passes through the mesh but about 90% by weight of the resin remains on the mesh.

The halogen-containing porous resin advantageously has a true specific gravity of 1.1–1.3, preferably 1.1–1.2 when wetted. When the true specific gravity is more than 1.3, the porous resin has reduced adsorbability and the dissolution amount of the halogen of the resin increases, both of which are undesirable.

The temperature at which an impure aqueous hydrogen peroxide solution is passed through the halogen-containing porous resin layer, suitably is about 30° C. or below, preferably −10° C. to 20° C. When the temperature is higher than about 30° C., the dissolution amount of halogen increases. The space velocity at which the aqueous solution is passed through the resin layer, advantageously is about 1 to about 200 l/hr, preferably about 5 to 100 l/hr.

The volume of the aqueous solution to be passed through and contacted with the halogen-containing porous resin layer, relative to the resin volume in the resin layer varies depending upon, for example, the concentration of organic impurities in the aqueous solution but desirably is generally about 100 to about 10,000 times, preferably about 200 to about 3,000 times.

The linear velocity at which the aqueous solution is passed through the halogen-containing porous resin layer is suitably about 1 to about 100 m/hr.

According to the present invention, an aqueous solution containing ordinarily about 10 to about 70% by weight, preferably about 20 to about 60% by weight of hydrogen peroxide is passed through each of the above-mentioned resins, whereby a desired high purity aqueous hydrogen peroxide solution can be obtained.

This procedure is preferably effected by packing each o the resins in an individual column and feeding the aqueous solution into each column. The feeding of the aqueous solution into each column may be continuous or intermittent.

In the present invention, the determination of impurities in aqueous hydrogen peroxide solution was made according to the following methods.

Cation impurities were determined according to flameless atomic absorption spectroscopy, using AA 670G Analyzer manufactured by Shimadzu Corp.

Anion impurities were determined according to ion chromatography, using QIC Analyzer manufactured by DIONEX.

Organic impurities were determined using a total carbon analyzer, i.e. TOC 500 Analyzer manufactured by Shimadzu Corp.

According to the present invention, there can be obtained an aqueous hydrogen peroxide solution of very high purity which contains each metal cation in an amount of not more than 5 ppb, each anion in an amount of not more than 10 ppb and organic impurities in an amount of not more than 5 ppm. The aqueous solution obtained can be used as it is or in admixture with other reagents, as a cleaning solution in the production of a semiconductor, particularly VLSI.

[EXAMPLES]

The present invention is described in more detail below by way of Examples and Comparative Examples.

EXAMPLE 1

As the cation exchange resin, there was used a styrene-divinylbenzene copolymer having a $SO_3H$ group as an ion exchange group, i.e. Amberlite 200 CH (trade name) manufactured by Organo K.K. As the anion exchange resin, there was used a strongly basic resin having a quaternary ammonium group, i.e. Amberlite IRA-900 (trade name) manufactured by Organo K.K. after converting it to a bicarbonate form. As the halogen-containing porous resin, there was used a brominated styrene-divinylbenzene copolymer, i.e. Sepabeads SP207 (trade name) having a specific surface area of 400 $m^2/g$ and 1.18 of true specific gravity manufactured by Mitsubishi Chemical Inductries, Ltd.

10 ml of each of these resins was packed in an individual column having an inside diameter of 10 mm and a length of 30 cm. The columns were connected in series in the order of the cation exchange resin, the halogen-containing porous resin and the anion exchange resin. Then, a crude aqueous hydrogen peroxide solution (hydrogen peroxide concentration: 31% by weight) was passed through the columns. The flow rate of the solution was 500 ml/hr, and the solution temperature was 8° C.

The results of purification are shown in Table 1. In the purified aqueous solution, the content of each cation impurity was less than 5 ppb, the content of each anion impurity was less than 10 ppb, and the content of organic impurities was less than 5 ppm.

EXAMPLE 2

The same resins as in Example 1 were used, but the cation exchange resin and the anion exchange resin were used as a cation/anion mixed-bed resin wherein the former and latter resins were mixed at a 1/1 volume ratio. The halogen-containing porous resin and the cation/anion mixed-bed resin were each packed in an individual column having an inside diameter of 10 mm and a length of 30 cm. The columns were connected in the order of the halogen-cntaining porous resin and the cation/anion mixed-bed resin. Other conditions were same as in Example 1.

The results of purification are shown in Table 1. In the purified aqueous solution, the content of each cation impurity was less than 5 ppb, the content of each anion impurity was less than 10 ppb, and the content of organic impurities was less than 5 ppm.

COMPARTIVE EXAMPLE 1

The same procedure as in Example 1 was repeated except that the order of column connection was changed to the cation exchange resin, the anion exchange resin and the halogen-containing porous resin.

The results of purification are shown in Table 1. In the purified aqueous solution, the content of each cation impurity was less than 5 ppb and the content of organic impurities was less than 5 ppm, but the content of bromine as an anion increased and could not be reduced to less than 10 ppb as desired.

COMPARATIVE EXAMPLE 2

The same procedure as in Example 1 was repeated except that the order of column connection was changed to the halogen-containing porous resin, the anion exchange resin and the cation exchange resin.

The results of purification are shown in Table 1. In the purified aqueous solution, the content of each cation impurity was less than 5 ppb and the content of organic impurities was less than 5 ppm, but the content of $SO_4$ ion as an anion increased and could not be reduced to less than 10 ppb as desired.

impurity was less than 10 ppb, and the content of organic impurities (total carbon amount) was less than 5 ppm.

What is claimed is:

1. A method for purifying an impure aqueous hydrogen peroxide solution, which comprises passing an impure aqueous hydrogen peroxide solution through
   (a) a cation exchange resin layer, a halogen-containing porous resin layer and an anion exchange resin layer in this order, or
   (b) a haloge-containing porous resin layer, a cation exchange resin layer and an anion exchange resin layer in this order, or
   (c) a halogen-containing porous resin layer and a mixed resin layer consisting of a cation exchange resin and an anion exchange resin in this order to contact said solution with each resin.

2. A method according to claim 1, wherein the cation exchange resin has a $SO_3H$ group as an ion exchange group.

3. A method according to claim 1, wherein the anion exchange resin has, as an ion exchange group, a quaternary ammonium group of carbonate or bicarbonate form.

4. A method according to claim 1, wherein the halogen-containing porous resin contains about 10–40% by weight of a halogen.

5. A method according to claim 1, wherein the halogen-containing porous resin has a specific surface area of about 200–600 m2/g.

6. A method according to claim 1, wherein the halogen-containing porous resin has a true specific gravity of 1.1–1.3 when wetted.

7. A method according to claim 1, wherein the im-

TABLE 1

| Impurity | Classification | Impurity content in material 31 wt. % hydrogen peroxide | Impurity content in purified hydrogen peroxide | | | |
| --- | --- | --- | --- | --- | --- | --- |
| | | | Example 1 | Example 2 | Comparative Example 1 | Comparative Example 2 |
| Na | Cation impurity | 242 ppb | <5 ppb | <5 ppb | <5 ppb | <5 ppb |
| Ca | Cation impurity | 23 ppb | <5 ppb | <5 ppb | <5 ppb | <5 ppb |
| K | Cation impurity | <10 ppb | <5 ppb | <5 ppb | <5 ppb | <5 ppb |
| Al | Cation impurity | 73 ppb | <5 ppb | <5 ppb | <5 ppb | <5 ppb |
| Fe | Cation impurity | 19 ppb | <5 ppb | <5 ppb | <5 ppb | <5 ppb |
| Cr | Cation impurity | 8 ppb | <5 ppb | <5 ppb | <5 ppb | <5 ppb |
| Cl | Anion impurity | 21 ppb | <10 ppb | <10 ppb | <10 ppb | <10 ppb |
| Br | Anion impurity | <10 ppb | <10 ppb | <10 ppb | 340 ppb | <10 ppb |
| $PO_4$ | Anion impurity | 512 ppb | <10 ppb | <10 ppb | <10 ppb | <10 ppb |
| $SO_4$ | Anion impurity | 15 ppb | <10 ppb | <10 ppb | <10 ppb | 30 ppb |
| Organic Impurities (total carbon amount) | Organic impurities | 21 ppm | <5 ppm | <5 ppm | <5 ppm | <5 ppm |

EXAMPLE 3

The same halogen-containing porous resin, cation exchange resin and anion exchange resin as in Exmample 1 were used. 10 ml of each of these resins was packed in an individual column having an inside diameter of 10 mm and a length of 30 cm. The column were connected in series in the order of the halogen-containing porous resin, the cation exchange resin and the anion exchange resin. Then, a crude aqueous hydrogen peroxide solution (hydrogen peroxide concentration: 31% by weight) was passed through the resins.

The flow rate of the aqueous solution and the solution temperature were same as in Example 1.

The results of purification are shown in Table 1. In the purified aqueous solution, the content of each cation impurity was less than 5 ppb, the content of each anion pure aqueous hydrogen peroxide solution contains hydrogen peroxide in a concentration of about 10–70% by weight.

8. A method according to claim 1, wherein the impure aqueous hydrogen peroxide solution contains organic impurities in a concentration of not more than about 500 mg/l in terms of total organic carbon amount.

9. A method according to claim 1, wherein the purified aqueous hydrogen peroxide solution contains each metal cation in an amount of not more than 5 ppb, each anion in an amount of not more than 10 ppb and organic impurities in an amount of not more than 5 ppm in terms of total organic carbon amount.

10. A method according to claim 1, wherein the impure aqueous hydrogen peroxide solution has been produced according to the anthraquinone process.

* * * * *